United States Patent Office 3,644,404
Patented Feb. 22, 1972

---

3,644,404
PROCESS FOR PREPARING HETEROCYCLIC POLYOLS AND ETHER DERIVATIVES
Peter E. Throckmorton, Prior Lake, Minn., assignor to Ashland Oil, Inc., Houston, Tex.
No Drawing. Filed Apr. 21, 1967, Ser. No. 632,562
Int. Cl. C07d 61/00
U.S. Cl. 260—327                                    6 Claims

ABSTRACT OF THE DISCLOSURE

In abstract, the specification discloses a process for preparing a heterocyclic compound of Formula I:

(I) 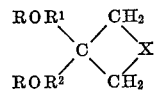

comprising reacting a carbonate of Formula II:

(II) 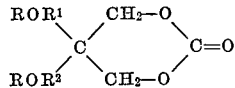

with an alkali metal thio or seleno cyanate of Formula III:

(III)         

and formation of the heterocyclic compound by pyrolysis or hydrolysis of said reaction product. In the above formulae, X is sulfur or selenium, $R^1$ and $R^2$ are alkylene radicals of 0 to 8 carbon atoms, R is alkyl of from 1 to 8 carbon atoms or hydrogen and Q is an alkali metal. The polyols of Formula I are used as radiation inhibitors in the products of ADM-446.

---

This invention relates to a novel process for preparing certain sulfur- or selenium-containing heterocyclic compounds. The compounds which can be produced by the process of the present invention find utility as precursors for the production of polyesters and the polyester urethanes having increased resistance to the deleterious effects of high energy radiation. This utility is described in copending application Ser. No. 587,695 filed Oct. 19, 1966, now having matured to U.S. 3,432,475, entitled, "Radiation Resistant Polyurethanes."

The heterocyclic polyols and ether derivatives which can be produced by the process of the present invention are those of Formula I:

(I) 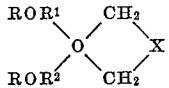

wherein X is sulfur or selenium and $R^1$ and $R^2$ are alkylene radicals of 0 to 8 carbon atoms, and R may be alkyl from 1 to 8 carbon atoms or hydrogen.

In general, the process of the present invention comprises reacting a carbonate of Formula II:

(II) 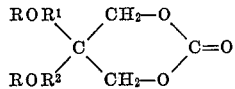

wherein $R^1$ and $R^2$ have the above-described meanings, with an alkali metal thio or seleno cyanate of Formula III:

(III)         

wherein X has the above-described meaning and Q is potassium, sodium, or lithium.

Potassium thiocyanate (KSCN) is the preferred cyanate of Formula III for forming the sulfur heterocycle.

The carbonate of Formula II can then be mixed with the cyanate of Formula III in a molar ratio of 1:1 to 1:2, and preferably 1:1 to 1:1.5, to form a reaction mixture containing a chemical intermediate, Formula IV:

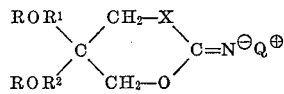

wherein R, $R^1$, $R^2$, X and Q have the above-described means.

The heterocyclic polyol or ether derivatve of Formula I can then be prepared by pyrolysis or hydrolysis of the intermediate of Formula IV.

In the pyrolysis, the intermediate IV is heated under vacuum first at 170° and then to 200° C. and the heterocyclic polyol is isolated by condensing the distillate from the reaction mixture. At temperatures below 170° C. the reaction proceeds very slowly, and at temperatures above 200° C. the reaction mixture produces tarry residues, with a consequent reduction in the yield of the heterocyclic polyol. The usual yields of heterocyclic polyol when employing recovery by pyrolysis are 35 to 50% of the theoretical.

An alternate method of preparation is by the hydrolysis of the chemical intermediate of Formula IV. The intermediate of Formula IV is produced by forming a reaction mixture of the carbonate of Formula II and the cyanate of Formula III, as described above, and as above heating the reaction mixture at 130° to 170° C., and preferably at 140° to 165° C., under anhydrous conditions until cessation of evolution of $CO_2$ produced by the reaction. While the heating can be effected at atmospheric pressures, subatmospheric pressures are preferred in order to facilitate removal of the $CO_2$. The chemical intermediate is then heated with a stoichiometric excess of water, and preferably more than 100% in excess of the stoichiometric amount, for 10 to 40 hours. The heterocyclic polyol can be isolated by continuous extraction with a water-insoluble organic solvent such as ethyl acetate and can be recrystallized, for example, from ethyl acetate/benzene.

A preferred method of isolation for sublimable polyols is by the sublimation of the heterocyclic compound produced by decomposition of the intermediate of Formula IV. The intermediate IV, which is prepared as described above, is heated under a cool surface at 160° to 200° C., and preferably at 170° to 185° C., at subatmospheric pressure, preferably below 10 mm. Hg and most preferably below 1 mm. Hg, until no more sublimate deposits on the cool surface, which generally occurs in a period of from 1 to 20 hours. The sublimate is the heterocyclic polyol of Formula I. Unreacted QCNO remains in the residue. A sublimable heterocyclic polyol is 3,3-bis(hydroxymethyl)thietane in which $R^1$ and $R^2$ each have one carbon atom and R is hydrogen.

In general, for heterocyclic polyols of Formula I having a large number of carbon atoms, the above-described pyrolysis distillation or hydrolysis recovery is preferred.

An especially advantageous and economical two-step process, as illustrated by D. B. Pattison in Journal of the American Chemical Society, volume 79, page 3455 (1957), results when the carbonate of Formula II is produced by a process comprising reacting pentaerythritol with an amount of dialkyl carbonate such as dimethyl carbonate, diethyl carbonate, ethylene carbonate, or other dialkyl carbonates of 1 to 5 carbon atoms or with phosgene. This step is conducted, for example, by mixing the pentaerythritol with the diethyl carbonate in the pressure of a catalytic quantity of a base, such as an alkali metal hydroxide, at a temperature of 125° to 100° C. until the reaction is complete, as determined by no further drop in temperature on contiuued heating. The mixture is slowly distilled until no further volatiles can be obtained at pot temperature 160° or below. Subatmospheric or superatmospheric pressure can be employed, depending on the carbonate employed. The molar ratios of pentaerythritol to carbonate ester are critical. A molar ratio of 1:1 is preferred. When less than this amount of diethyl carbonate is employed, less than complete conversion of pentaerythritol to the cyclic carbonate results. When more than this amount of diethyl carbonate is employed, the residual hydroxyl groups of the pentaerythritol also react with a molecule of the diethyl carbonate, producing a dicarbonate and reducing the yield of the monocyclic carbonate useful in the process of the present invention. While the carbonate of Formula II has been written as a cyclic monomer, the above-described and other well-known procedures for producing these carbonates also produce varying proportions up to 100% of polymeric carbonates. Since these polymeric carbonates react in the same manner, under the conditions of the present invention, as the monomeric cyclic carbonates, Formula II is intended to embrace both.

Examples of specific heterocyclic compounds of Formula I which can be prepared by the process of the present invention include, among others:

3,3-bis(hydroxymethyl)thietane
3,3-bis(hydroxyoctyl)thietane
3,3-bis(hydroxyethyl)thietane
3,3-bis(hydroxypropyl)thietane
3,3-bis(hydroxyisopropyl)thietane
3,3-bis(hydroxyisobutyl)thietane
3,3-bis(hydroxy-tert-butyl)thietane
3,3-bis(hydroxymethyl)selenetane
3,3-bis(hydroxyoctyl)selenetane
3,3-bis(hydroxyethyl)selenetane
3,3-bis(hydroxypropyl)selenetane
3,3-bis(hydroxyisopropyl)selenetane
3,3-bis(hydroxyisobutyl)selenetane
3,3-bis(hydroxy-tert-butyl)selenetane
3-hydroxymethyl-3-hydroxyethyl-thietane
3-(2-hydroxypropyl)-3-hydroxymethyl-thietane
3,3-dimethoxythietane
3,3-diethoxythietane
3,3-bis(methoxymethyl)thietane
3,3-bis(ethoxymethyl)thietane
3,3-bis(methoxyethyl)thietane
3,3-bis(methoxyisobutyl)thietane
3,3-dimethoxyselentane The invention may be better understood by reference to the following examples in which all parts and percentages are by weight unless otherwise indicated. These operative examples are illustrative of certain embodiments designed to teach those skilled in the art how to practice the invention and are not intended to limit the scope of the invention in any manner.

EXAMPLE 1

This example illustrates the synthesis of a carbonate of Formula II wherein $R^1$ and $R^2$ are methylene and R is hydrogen.

Pentaerythritol (1 mole), diethyl carbonate (1 mole), and a small chip of sodium metal or alkali hydroxide were mixed and heated at 125° C. for 5 hours to 100° C. or until no further temperature drop. Two moles of ethanol were then slowly removed by distillation. The 5,5-bis(hydroxymethyl)-1,3-dioxan-2-one (cyclic carbonate) was the ditillation residue and is not purified further but used directly.

EXAMPLE 2

This example illustrates the synthesis of a heterocyclic polyol according to the method of the present invention by the formation and pyrolysis of a chemical intermediate of Formula IV.

The carbonate of Example 1 (1 mole) was mixed with KSCN (1½ moles) and heated under vacuum to 160° C. until cessation of evolution of $CO_2$. Forty-six gram portions of the residue were heated under vacuum in a sublimation apparatus for several hours at 170°–180° C. (0.25 mm.) until no further sublimate appeared. Crystalline 3,3-bis(hydroxymethyl)thietane (10.4 g., 47% of the theoretical yield) having a melting point of 67°–70.5° C. was collected on the cold surface of the apparatus. Recrystallization from benzene-ethylacetate solvent afforded the pure heterocyclic diol, M.P. 76°–77°, a white crystalline solid.

EXAMPLE 3

The procedure of Example 2 is repeated employing the same times, temperatures and conditions with the single exception that KSCN is replaced by an equivalent number of moles of KSeCN. The product produced is a selenetane of Formula I.

EXAMPLE 4

This example illustrates the synthesis of a heterocyclic polyol by the hydrolysis of a chemical intermediate of Formula IV.

The cyclic carbonate of Example 1 (1 mole) was mixed with KSCN (1 mole) and heated under vacuum to 160° C. until cessation of evolution of $CO_2$. 98.1 g. of the residue and 200 g. of distilled water were heated at reflux temperature for 24 hours. The reflux condenser was removed and the water distilled off at 60° C. in a rotary vacuum apparatus, leaving a liquid residue. This liquid residue was solvent-extracted with boiling ethyl acetate (250 ml.) to form a solution containing 3,3-bis(hydroxymethyl)thietane (14.7 g. 25.8% of theoretical), which was recovered by evaporating the ethyl acetate under vacuum and then recrystallizing the thietane from a solvent consisting of 10% ethyl acetate and 90% benzene.

Although the invention has been described in considerable detail with reference to certain preferred embodiments thereof, it will be understood that variations and modifications can be effected within the spirit and scope of the invention as described above and as defined in the appended claims.

What is claimed is:

1. A process for preparing a heterocyclic compound of the formula:

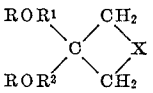

comprising reacting at a temperature from 130° to 170° C., a carbonate of the formula:

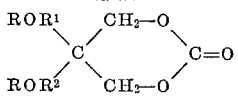

with an alkali metal thio or seleno cyanate of the formula:

QXCN wherein said formulas X is sulfur or selenium and $R^1$ and $R^2$ are alkylene radicals of 0 to 8 carbon atoms, R is an alkyl radical of 1 to 8 carbon atoms or hydrogen, and Q is an alkali metal; to provide a reaction mixture containing the intermediate corresponding to the following formula:

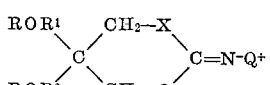

and thereupon converting the intermediate to said heterocyclic compound by heating said reaction mixture under vacuum at a temperature between 170° to 200° C.

2. The process of claim 1 wherein X is sulfur.

3. The process of claim 1 wherein the heterocyclic compound is 3,3-bis(hydroxymethyl)thietane of the following formula:

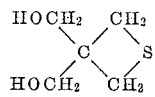

4. The process of claim 3 wherein the 3,3-bis(hydroxymethyl)thietane is produced by a process comprising reacting pentaerythritol with one-half the stoichiometric amount of a dialkyl carbonate.

5. The process of claim 1 wherein the heterocyclic compound is 3,3-bis(methoxymethyl)thietane of the following formula:

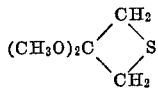

6. A process for preparing a heterocyclic compound of the formula:

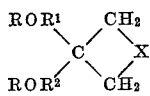

comprising reacting at a temperature from 130° to 170° C., a carbonate of the formula:

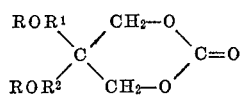

with an alkali metal thio or seleno cyanate of the formula:

QXCN wherein said formula X is sulfur or selenium and $R^1$ and $R^2$ are alkylene radicals of 0 to 8 carbon atoms, R is an alkyl radical of 1 to 8 carbon atoms or hydrogen, and Q is an alkali metal; to provide a reaction mixture containing the intermediate corresponding to the following formula:

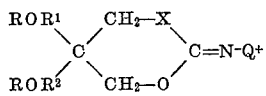

and thereupon converting the intermediate to said heterocyclic compound by hydrolyzing said reaction mixture in the presence of a stoichiometric excess of water based on the intermediate content of the reaction mixture.

References Cited
UNITED STATES PATENTS 3,251,857   5/1966   Hostettler et al. ____ 260—327

JAMES A. PATTEN, Primary Examiner

U.S. Cl. X.R.

117—161; 161—180; 260—2.5, 75, 77.5, 239, 340.2, 340.9, 463